United States Patent [19]

Miyashita et al.

[11] Patent Number: 5,083,804
[45] Date of Patent: Jan. 28, 1992

[54] HARD CART FOR USE IN TRANSPORTING A SELF-PROPELLED VEHICLE

[75] Inventors: Susumu Miyashita, Kodaira; Nori Harada, Ome, both of Japan

[73] Assignee: Kioritz Corporation, Tokyo, Japan

[21] Appl. No.: 676,466

[22] Filed: Mar. 26, 1991

Related U.S. Application Data

[63] Continuation of Ser. No. 7,463,725, Jan. 12, 1990, abandoned.

[30] Foreign Application Priority Data

Jan. 13, 1989 [JP] Japan .......................... 1-002144[U]

[51] Int. Cl.⁵ .............................................. B62B 3/04
[52] U.S. Cl. ............................ 280/47.34; 280/33.998; 280/79.4
[58] Field of Search ................ 280/33.998, 79.4, 79.6, 280/47.19, 47.34, 47.35, 639, 651, 656; 180/198; 105/26.05, 72.2

[56] References Cited

U.S. PATENT DOCUMENTS

| | | | |
|---|---|---|---|
| 1,416,515 | 5/1922 | Saunders | 280/33.998 X |
| 2,392,409 | 1/1946 | Ray | 280/47.34 X |
| 2,543,276 | 2/1951 | Buechler | 280/47.34 X |
| 2,551,483 | 5/1951 | Bartoe | 280/47.34 |
| 2,569,050 | 9/1951 | Gref et al. | 280/79.6 X |
| 2,628,847 | 2/1953 | Hawkins | 280/33.998 X |
| 2,782,076 | 2/1957 | Miller | 180/198 X |
| 3,926,128 | 12/1975 | Zappel | 105/26.05 |
| 4,465,421 | 8/1984 | Murillo | 280/79.4 X |
| 4,806,061 | 2/1989 | Fenton | 280/656 X |
| 4,822,069 | 4/1989 | Burgess | 280/656 X |
| 4,902,027 | 2/1990 | Skelly | 280/33.998 |
| 4,913,459 | 4/1990 | Smeitink | 280/79.4 X |
| 5,029,665 | 7/1991 | Harada | 180/198 |

FOREIGN PATENT DOCUMENTS

| | | | |
|---|---|---|---|
| 526017 | 6/1956 | Canada | 105/72.2 |
| 2298464 | 8/1976 | France | 280/475 |
| 189783 | 12/1983 | Japan . | |

Primary Examiner—Robert P. Olszewski
Assistant Examiner—Brian L. Johnson
Attorney, Agent, or Firm—Browdy and Neimark

[57] ABSTRACT

A self-propelled car is placed on a handcart in such a manner that it can freely ride on and ride off of the handcart. The handcart is provided with at least one roller which engages with the driving wheels of the self-propelled car to interrupt the running thereof.

2 Claims, 3 Drawing Sheets

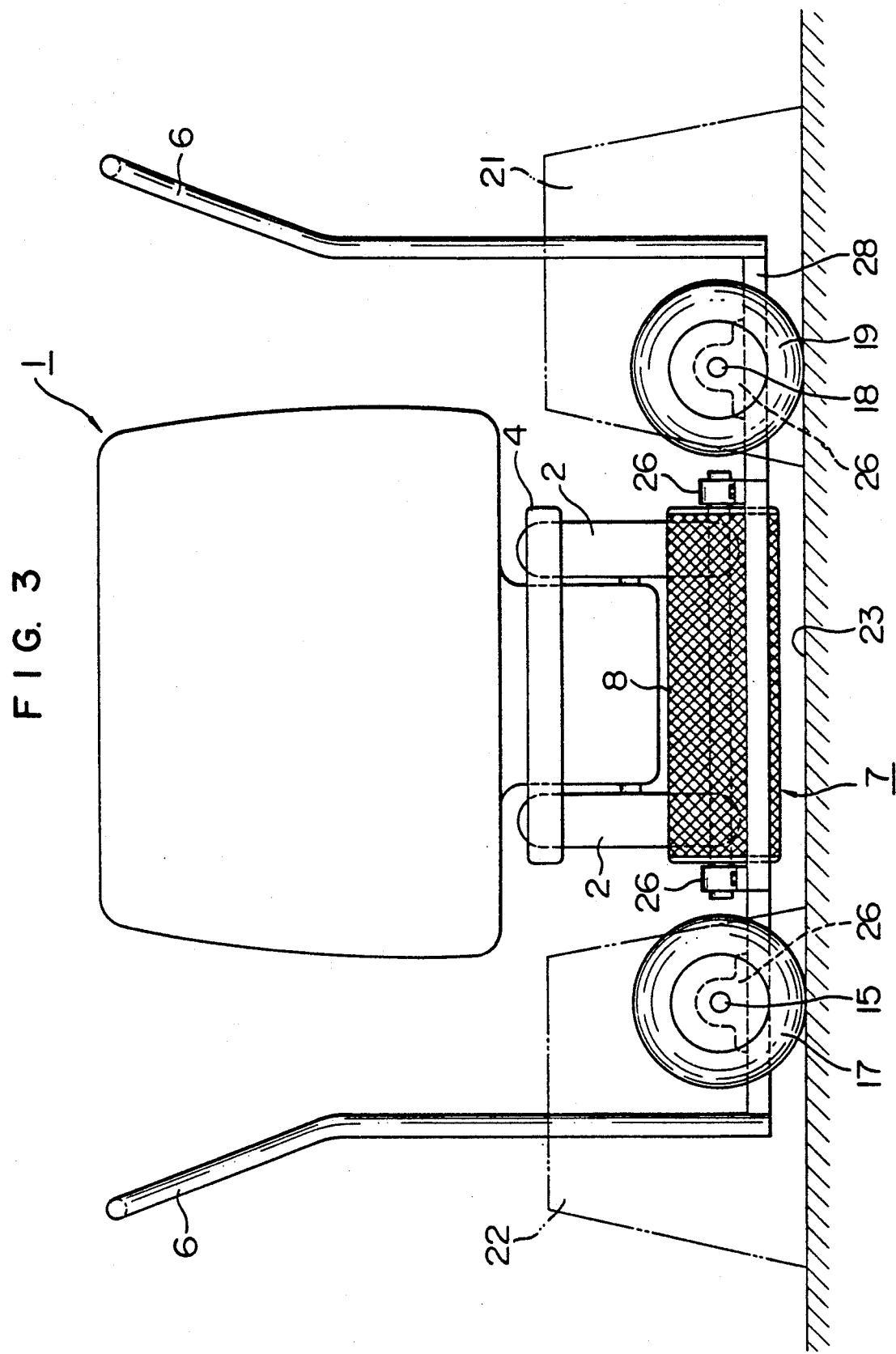

HARD CART FOR USE IN TRANSPORTING A SELF-PROPELLED VEHICLE

This application is a continuation of application Ser. No. 07/463,725, filed Jan. 12, 1990 now abandoned.

BACKGROUND OF THE INVENTION

1. Field of the Invention

The present invention relates to a handcart for use in conveyance which enables the direction of progress of a self-propelled car to be readily changed.

2. Description of the Related Art

Electric motor driven self-propelled cars have been used in the operations in a greenhouse (a hothouse), which are required to grow, for example, vegetables. Such self-propelled cars are capable of moving back and forth between ridges in the greenhouse, and are used to sprinkle water or spray chemicals over the plants.

It is general that the above-described type self-propelled car can automatically move back and forth along a longitudinal region between adjacent ridges but that it must be manually moved in the lateral direction in a head region to a position where it faces another adjacent longitudinal region.

Japanese Utility Model Unexamined Publication No. 58-189783 discloses a technique for automatically moving this self-propelled car in the lateral direction in the head region to a position where it faces another adjacent longitudinal region. In this technique, an electric motor driven self-propelled cart capable of moving in the lateral direction with the self-propelled car placed thereon is provided.

However, in the conventional technique of the above-described type, both the self-propelled car and the cart are respectively provided with a driving device. One of the driving devices is not used at all while the self-propelled car or the cart is being moved in its associated direction. Furthermore, switch-over operation between the two driving devices requires a complicated structure.

Furthermore, a special consideration has to be made to safely absorb the running force by inertia without applying overloads on the individual components when the self-propelled car is automatically stopped at a predetermined position on the cart. Hence, the overall size and the weight of the apparatus are increased, and the production cost is increased. Installation of the apparatus is a troublesome work, and a failure readily occurs.

SUMMARY OF THE INVENTION

In view of the aforementioned problems of the prior techniques, an object of the present invention is to provide a handcart for use in conveyance which is provided with a roller which engages with driving wheels of a self-propelled car when the self-propelled car is placed on the handcart to interrupt the running of the self-propelled car.

In consequence, when the self-propelled car rides on the handcart, running of the self-propelled car is automatically interrupted, and the handcart with the self-propelled car placed thereon can be freely wheeled to any position.

More specifically, in the handcart for use in conveyance according to the present invention, driving force of the self-propelled car is made null and void by utilizing the roller provided on the handcart, and the self-propelled car can therefore be automatically and safely stopped without applying overloads to the individual components. Further, the overall mechanism of the system can be simplified, and the size and the weight thereof can be reduced. The production cost is low. The handcart according to the present invention is reliable and suitable for use in labor-saving operations.

BRIEF DESCRIPTION OF THE DRAWINGS

FIG. 3 is a side view of the handcart of FIG. 1.

DETAILED DESCRIPTION OF THE INVENTION

Figure 1:
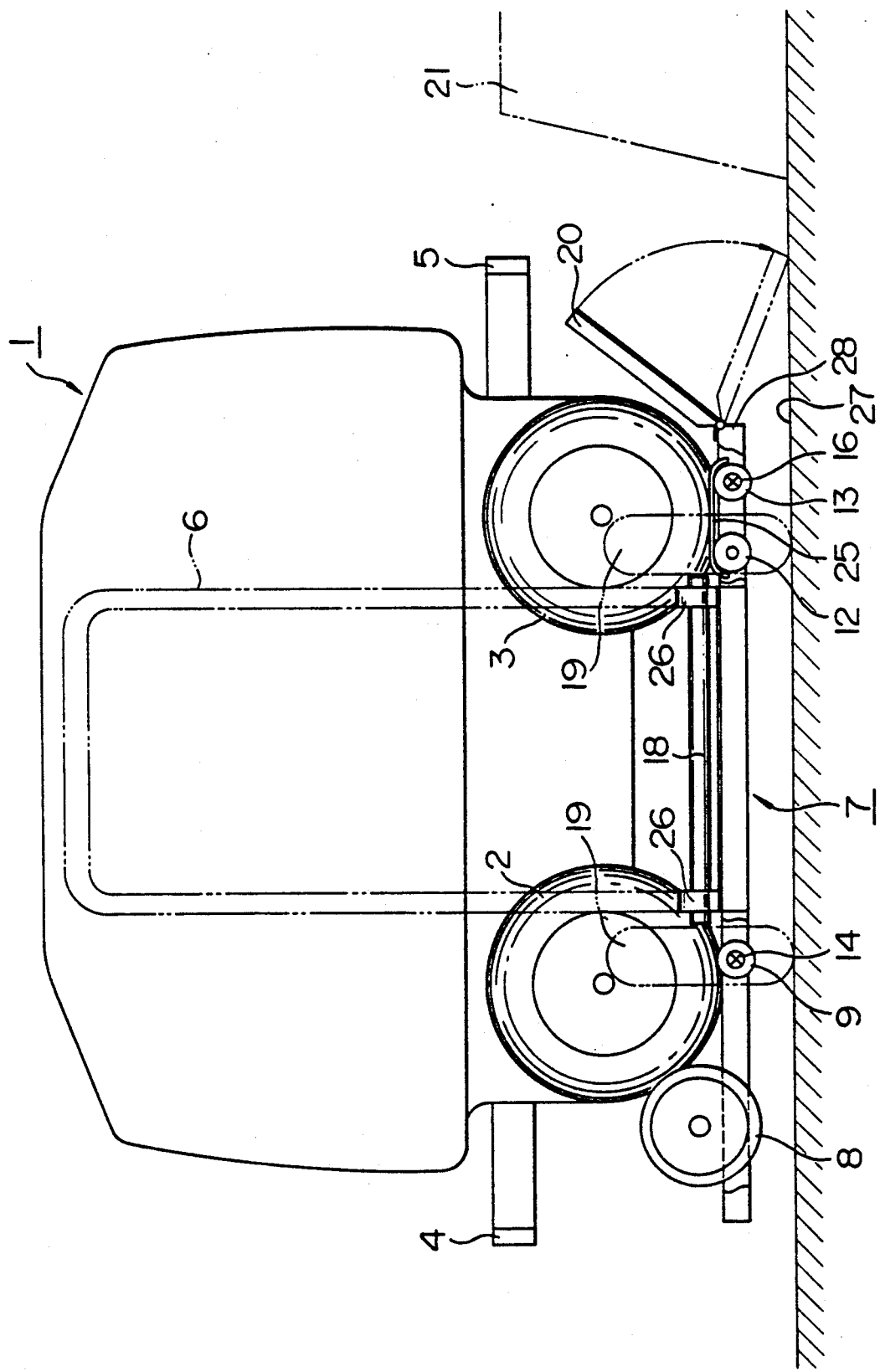
FIG. 1 is a front elevational view of one embodiment of a handcart according to the present invention.

An embodiment of the present invention will be described below with reference to the accompanying drawings.

A self-propelled car 1 is capable of automatically moving back and forth along a longitudinal region 23 between adjacent ridges 21 and 22 in a greenhouse. A handcart 7 is capable of moving in the lateral direction along a head region 27 located at one end of each of the ridges 21,22 in a state where the self-propelled car 1 is placed thereon.

Although the self-propelled car 1 is not described in detail because it is not the gist of the present invention, it is provided with an automatic-winding hose reel and a spraying nozzle. The self-propelled car 1 is equipped with an electric motor which serves as a self-propelling means. Power is supplied to the motor from a battery mounted on the car 1. The self-propelled car 1 also has front and rear rubber tire type wheels 2 and 3 (the left side of the handcart as viewed in FIG. 1 is referred to as the front for convenience) on two axes, by means of which it can travel forward and backward.

One-way clutchs (not shown) for front wheels and rear wheels which rotate in opposite directions each other when the self-propelled car 1 moves in the forward and rearward directions may be provided between each of the rubber front and rear wheels 2 and 3 and the electric motor so as to allow only the front wheels as viewed in the advancing direction of the self-propelled car 1 to operate as the driving wheels. In this way, running performance of the self-propelled car 1 can be improved.

Switch rods 4 and 5 for switching-over the direction of rotation of the electric motor protrude from the front and rear ends of the self-propelled car 1. When the switch rod 5 provided at the rear end abuts against a post (not shown) provided at the other end of the longitudinal region 23 which is remote from the head region 27, the direction of rotation of the electric motor is switched-over, and the forward and rearward movements of the self-propelled car 1 are thereby automatically switched-over.

By pushing in the switch rod 4 provided at the front end when the handcart 7 with the self-propelled car 1 therein is conveyed in the lateral direction to the central position of the subsequent longitudinal region 23, the self-propelled car 1 starts moving forward again. Then, the self-propelled car 1 is running forward again at the central position of the subsequent longitudinal region 23.

Figure 2:
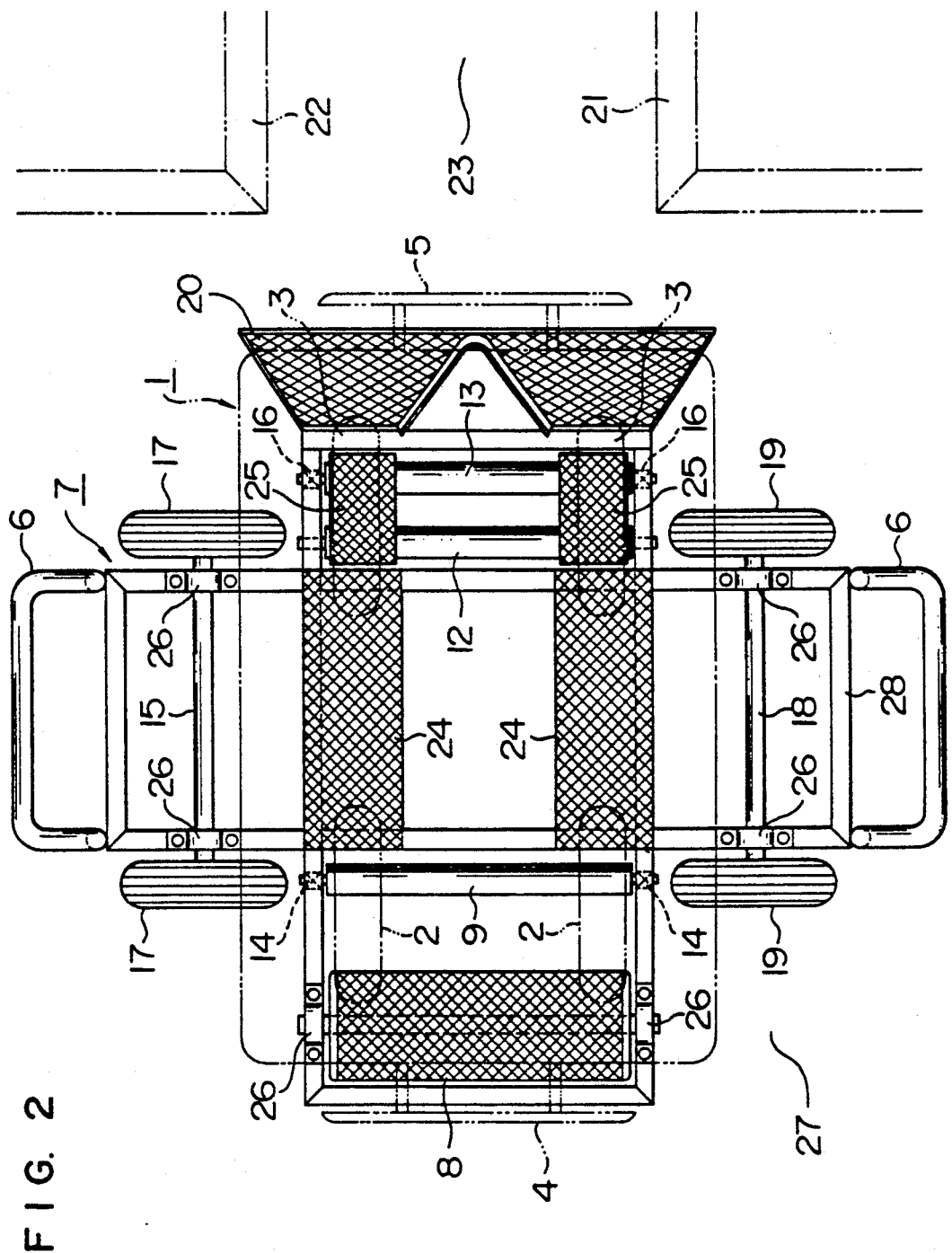
FIG. 2 is a plan view of the handcart of FIG. 1.

The handcart 7 has a cross-shaped frame member 28 which extends in the longitudinal direction which is the direction in which the longitudinal region 23 extends and in the lateral direction which is the direction in which the head region 27 extends. Two axes 18 and 15 are mounted on the lateral front and rear ends (the downward end as viewed in FIG. 2 is referred to as the front end for convenience) of the frame member 28 by means of mounting members 26, and rubber tire type front and rear wheels 19 and 17 are rotatably mounted at the two ends of the individual axis 18 and 15. In consequence, the handcart 7 can be wheeled in the forward and rearward directions along the head region 27 by pushing handles 6 provided at the lateral front and rear ends of the frame member 28.

Floor plates 24 extend from the central portion of the frame member 28 to the longitudinal rear end thereof through a length which corresponds to the tread of the wheels 2 and 3 of the self-propelled car 1. A slope plate 20 is provided at the longitudinal rear end of the floor plates 24 so as to facilitate the riding of the self-propelled car 1 onto the handcart 7. The slope plate 20 is raised by means of an adequate coupling means (which is not shown) once the self-propelled car 1 rides on the handcart 7.

At the longitudinal front end of the frame member 28 are rotatably provided rollers 8 and 9, which press against the lower front and rear sides of the rubber tire type front wheels 2 when the self-propelled car 1 is placed at its position on the handcart 7. The rollers 8 and 9 make the driving force of the rubber tire type front wheels 2 in the forward direction null and void, and thereby interrupt running of the self-propelled car 1.

The front roller 8 is larger in diameter than the rear one 9 so as to ensure that running of the self-propelled car 1 is stopped reliably.

If the front roller 8 is the same as the rear roller 9, it may be mounted at the upper position so as to secure the same effect.

The slope plate 20, the floor plates 24, the front roller 8 may be made of an expanded metal (a reticulated steel plate) so as to facilitate removal of mud.

The self-propelled car 1, which is advanced along the longitudinal region 23, rides on the handcart 7, where the rubber tire type front wheels 2 of the self-propelled car 1 press against the rollers 8 and 9 of the handcart, and the progress thereof is thereby hindered. In consequence, even when the rubber tire type front wheels 2 continue rotating, the driving force of the front wheels 2 is absorbed by the rollers 8 and 9 and is made null and void, thereby automatically interrupting the running of the self-propelled car 1. Afterwards, whether the power is turned off or not, the handcart 7 with the self-propelled car 1 thereon can be wheeled by an operator who pushes the handle 6.

The above description explains the case of a self-propelled car 1 in which only the front wheels 2 are driving wheels. In order to allow the present invention to be applied to a rear wheel or four wheel drive self-propelled car, the handcart 7 may be provided with rollers 12 and 13 which press against the lower front and rear sides of the rear wheels 3. Foot plates may be detachably mounted on the rollers 12 and 13.

Furthermore, the rollers 9 and 13 with which the lower rear sides of the front and rear wheels 2 and respectively make contact may be respectively provided with one-way clutches 14 and 16 for permitting rolling of the rollers 9 and 13 only to the right as viewed in FIG. 1.

More specifically, in a case of the front wheel drive self-propelled car 1, the rollers 12 and 13 for the rear wheels 3 are covered by the foot plates 25 to make them null and void. When the self-propelled car 1 rides on the handcart 7, the front wheels 2 of the self-propelled car 1, which are the driving wheels, ride on the roller 9 of the handcart 7. Thereafter, the self-propelled car 1 advances by inertia, and the front wheels 2 abut against the large diameter roller 8, thereby automatically stopping the self-propelled car 1 even though the front wheels 2 of the self-propelled car 1 continue rotating.

In that state, the operator pushes the handcart 7 to the central position of a subsequent longitudinal region 23 and presses the switch rod 4 provided at the front end of the self-propelled car 1. This makes the rear wheels 3 operate as the driving wheels, and the self-propelled car 1 therefore starts running past the foot plates 25 and out of the handcart 7, and then along the longitudinal region 23.

Once the self-propelled car 1 reaches the other end of the longitudinal region 23 and the rear switch rod 5 strikes the post and is therefore pushed in, the front wheels 2 start operating as the driving wheels, and the self-propelled car 1 moves back along the longitudinal region 23 and then rides again on the handcart 7 located at the head region 27, where the driving force of the self-propelled car 1 is absorbed by the rollers 8 and 9 to interrupt the running. Thereafter, the above-described sequence of operations are repeated. Once the operation is completed, power is turned off, and the operator conveys the handcart 7 with the self-propelled car 1 thereon to an appropriate position by pushing the handle 6.

In the case of a rear wheel drive self-propelled car 1, the foot plates 25 of the handcart 7 are removed so as to allow the rear rollers 12 and 13 to operate. When the self-propelled car 1 is located on the handcart 7, the driving force of the rear wheels 3 which are the driving wheels of the self-propelled car 1 is made null and void by the rear rollers 12 and 13, and the running of the self-propelled car 1 is thereby interrupted.

When the self-propelled car 1 is to be lowered from the handcart 7, the switch rod 4 is pushed in to allow the front wheels 2 to rotate rightward as viewed in FIG. 1 and thereby operate as the driving wheels. At that time, the one-way clutch 14 provided on the roller 9 operates to prevent rotation of the roller 9 leftward as viewed in FIG. 1. As a result, the driving force is effectively imparted to the self-propelled car 1, and the self-propelled car 1 starts running and goes down from the handcart 7.

In the case of a four wheel drive self-propelled car 1 in which both the fount and rear wheels operate as the driving wheels, the foot plates 25 are removed, like the case of the rear wheel drive self-propelled car. When the self-propelled car 1 rides on the handcart 7, it rides on the rollers 8, 9 and 12, 13, and the driving force is made null and void to interrupt the running of the self-propelled car 1.

Next, when the self-propelled car 1 is to be lowered from the handcart 7, the switch rod 4 provided at the front end is pushed in to allow the front and rear wheels 2 and 3 to rotate rightward as viewed in FIG. 1 and thereby operate as the driving wheels. At that time, the one-way clutches 14 and 16 operate to prevent rotation of the rollers 9 and 13 leftward as viewed in FIG. 1. As a result, the driving force of the front and rear wheels 2 and 3 is effectively imparted to the self-propelled car 1, and the self-propelled car 1 starts running even though it is so heavy.

What is claimed is:

1. A traveling apparatus comprising a self-propelling car having a drive means and having front and rear drive wheels, a hand carriage cart having a mount means for allowing said self-propelling car to be mounted thereon and dismounted therefrom, wherein said self-propelling car has front wheels driven by said drive means in a first direction of rotation, said hand carriage cart having a freely rotatable roller; said self-propelling car is stopped at a predetermined position on said mount means by abutment of said front wheels against said roller, wherein said front wheels freely rotate against said roller and wherein the drive force of said front wheels is rendered null and void by said wheels freely rotating against said roller, wherein said self propelling car front drive wheels are driven in the opposite direction as said rear drive wheels, wherein only one of said front and said rear wheels are driven at a time, and spaced rollers on said hand carriage cart having one-way clutches to engage said front and rear wheels, and wherein said self-propelling car is moved on and off of said hand carriage cart when said front and rear wheels change to a second direction of rotation and engage said spaced rollers which are prevented from rolling by said one-way clutches.

2. A traveling apparatus in accordance with claim 1 wherein said front and rear wheels on said self-propelling car have one-way clutches which alternately permit rotation in opposite directions.

* * * * *